United States Patent
Chang et al.

(10) Patent No.: US 6,622,580 B1
(45) Date of Patent: Sep. 23, 2003

(54) BACKLASH-FREE SPEED REDUCING DEVICE

(75) Inventors: Pyung Hun Chang, Taejon (KR); Ju Yi Park, Taejon (KR); Hyung Soon Park, Taejon (KR); Je Hyung Jung, Taejon (KR); Bo Kyoung Jeon, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/784,348

(22) Filed: Feb. 16, 2001

(30) Foreign Application Priority Data

Jan. 19, 2001 (KR) .......................................... 2001-3297

(51) Int. Cl.⁷ ............................................. F16H 19/00
(52) U.S. Cl. ............................... 74/63; 74/409; 242/397
(58) Field of Search ...................... 74/10.7, 63, 89.2, 74/409, 410, 500.5, 501.5 R, 505, 506; 242/397, 375.3

(56) References Cited

U.S. PATENT DOCUMENTS

| | | | | |
|---|---|---|---|---|
| 903,997 A | * | 11/1908 | Martinson | ................... 74/89.2 |
| 1,854,555 A | * | 4/1932 | Mendola | ...................... 74/10.7 |
| 2,212,823 A | * | 8/1940 | Bulk | ............................ 74/89.22 |
| 2,430,523 A | * | 11/1947 | Meyer | ........................ 415/147 |
| 2,868,504 A | * | 1/1959 | Minty | ........................ 242/397 |
| 5,022,619 A | * | 6/1991 | Mamada | ................... 248/187.1 |
| 5,105,672 A | * | 4/1992 | Carson et al. | ............... 74/10.7 |
| 5,207,114 A | | 5/1993 | Salisbury, Jr. et al. | |
| 5,388,480 A | | 2/1995 | Townsend | |

* cited by examiner

Primary Examiner—William C Joyce
(74) Attorney, Agent, or Firm—Rothwell, Figg, Ernest & Manbeck

(57) ABSTRACT

A backlash-free speed reducing device includes a drive unit, a rotary unit, and a power output unit. The drive unit consists of a drive motor having a drive shaft. A first power transmission cable is wound around the drive shaft. The rotary unit has two first cylinders, with the first transmission cable fixed to the external surface of the first cylinders at opposite ends thereof and wound around or unwound from the first cylinders in response to a rotation of the drive shaft. Each of the first cylinders is concentrically fitted over a rotating shaft such that the first cylinders are linearly movable along the rotating shafts in opposite directions. A second power transmission cable is fixed to the external surfaces of the rotating shafts of the two first cylinders at opposite ends thereof. The power output unit has a second cylinder, with the second transmission cable wound around the second cylinder. This second cylinder is concentrically fitted over a power output shaft such that the cylinder is linearly movable along the power output shaft. The two power transmission cables thus maintain desired tension during an operation of the speed reducing device for achieving a high speed reduction ration, and so it is possible to prevent a backlash of the cables during such operation.

4 Claims, 3 Drawing Sheets

BACKLASH-FREE SPEED REDUCING DEVICE

BACKGROUND OF THE INVENTION

1. Field of the Invention

The present invention relates to backlash-free speed reducing devices and, more particularly, to a backlash-free speed reducing device designed to allow all the rotatable cylinders of a rotary unit and a power output unit to be linearly movable along their shafts in opposite directions when the cylinders are rotated by power transmission cables operated in conjunction with the drive shaft of a drive motor, thus maintaining desired tension of the transmission cables during an operation of the speed reducing device for achieving a high speed reduction ratio and preventing a backlash of the cables during such operation.

2. Description of the Prior Art

FIG. 1 is a perspective view of a conventional speed reducing device. As shown in the drawing, the conventional speed reducing device comprises a longitudinal drive shaft 120 axially extending from a drive motor 140. A first power transmission cable 180 is fixed to the external surfaces of two first cylinders 220 of a rotary unit 200 at its opposite ends. This first transmission cable 180 is also wound around the drive shaft 120 of a drive motor 140 several times at its middle portion. Therefore, the cable 180 can be wound around or unwound from the two first cylinders 220 while rotating the cylinders 220 in response to a rotation of the drive shaft 120.

A rotating shaft 240 is axially fixed to the center of one end of each first cylinder 220. A second power transmission cable 160 is fixed to the external surfaces of the rotating shafts 240 of the two first cylinders 220 at its opposite ends. This second transmission cable 160 is also wound around the second cylinder 320 of a power output unit 300 several times at it middle portion. The second transmission cable 160 can be thus wound around or unwound from the rotating shafts 240 of the two first cylinders 220 while rotating the second cylinder 320 of the power output unit 300 in accordance with a rotation of the two first cylinders 220. Therefore, the rotating force of the drive motor 140 is transmitted to the power output unit 300 through the drive shaft 120, the first transmission cable 180, the rotary unit 200, and the second transmission cable 160.

In the conventional speed reducing device, the first cable 180 is fixed to one of the two first cylinders 220 at one end thereof, and extends from the first cylinder 220 to be wound around the drive shaft 120 several times prior to being fixed to the other first cylinder 220 at the other end thereof.

When the drive shaft 120 is rotated in a direction by the rotating force of the motor 140, the first cable 180 is unwound from one of the two first cylinders 220, and is wound around the other first cylinder 220, thus finally rotating the power output shaft 340 of the power output unit 300. In such a case, the first transmission cable 180 is moved in either direction in accordance with a rotating direction of the drive shaft 120.

However, the conventional speed reducing device has the following problems. That is, when the first transmission cable 180 is wound around or unwound from the two first cylinders 220 in accordance with a rotation of the drive shaft 120, it is almost impossible to maintain a desired tension of the first cable 180 at portions between the drive motor 120 and the two first cylinders 220 during the rotation of the drive shaft 120. That is, the first transmission cable 180 is undesirably loosened to lose its desired tension when the speed reducing device is operated to achieve a high speed reduction ratio. In such a case, the speed reducing device creates a backlash of the first cable 180.

Due to such a backlash created by the uneven tension of the first transmission cable 180, it is almost impossible to appropriately transmit the rotating force of the first cylinders 220 to the power output unit 300 through the second transmission cable 160. Such a backlash also prevents the speed reducing device from achieving a desired high speed reduction ratio.

SUMMARY OF THE INVENTION

Accordingly, the present invention has been made keeping in mind the above problems occurring in the prior art, and an object of the present invention is to provide a backlash-free speed reducing device, which is designed to allow all the rotatable cylinders of a rotary unit and a power output unit to be linearly movable along their shafts in opposite directions when the cylinders are rotated by power transmission cables operated in conjunction with the drive shaft of a drive motor, thus maintaining desired tension of the transmission cables during an operation of the speed reducing device for achieving a high speed reduction ratio and preventing a backlash of the cables during such operation.

In order to accomplish the above object, the present invention provides a backlash-free speed reducing device, comprising a drive unit consisting of a drive motor, with a drive shaft axially extending from the drive motor; a first power transmission cable wound around the drive shaft a predetermined number of times; a rotary unit having a least one first rotatable cylinder, with the first transmission cable fixed to the external surface of the first rotatable cylinder at an end thereof and wound around or unwound from the first rotatable cylinder in response to a rotation of the drive shaft, the first rotatable cylinder being concentrically fitted over a rotating shaft such that the first rotatable cylinder is linearly movable along the rotating shaft in opposite directions; a second power transmission cable fixed to the external surface of the rotating shaft of the rotary unit at one end thereof and wound around the rotating shaft a predetermined number of times; and a power output unit having a second rotatable cylinder, with the second transmission cable wound around the second rotatable cylinder, the second rotatable cylinder being concentrically fitted over a power output shaft.

In the backlash-free speed reducing device, the rotary unit preferably has two first rotatable cylinders concentrically fitted over two rotating shafts, respectively, such that the two first rotatable cylinders are linearly movable along the two rotating shafts.

The first transmission cable is fixed to the external surfaces of the two first rotatable cylinders at opposite ends thereof, and is wound around or unwound from the first rotatable cylinders in response to a rotation of the drive shaft.

The first rotatable cylinder is linearly movable along the rotating shaft in opposite directions.

In addition, the second rotatable cylinder is linearly movable along the power output shaft in opposite directions.

In the backlash-free speed reducing device, a first fixing hole is formed on the external surface of the first rotatable cylinder so as to fix the end of the first transmission cable on the first rotatable cylinder.

In the backlash-free speed reducing device, a second fixing hole is formed on the external surface of the rotating shaft of the first rotatable cylinder so as to fix the end of the first transmission cable on the rotating shaft.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
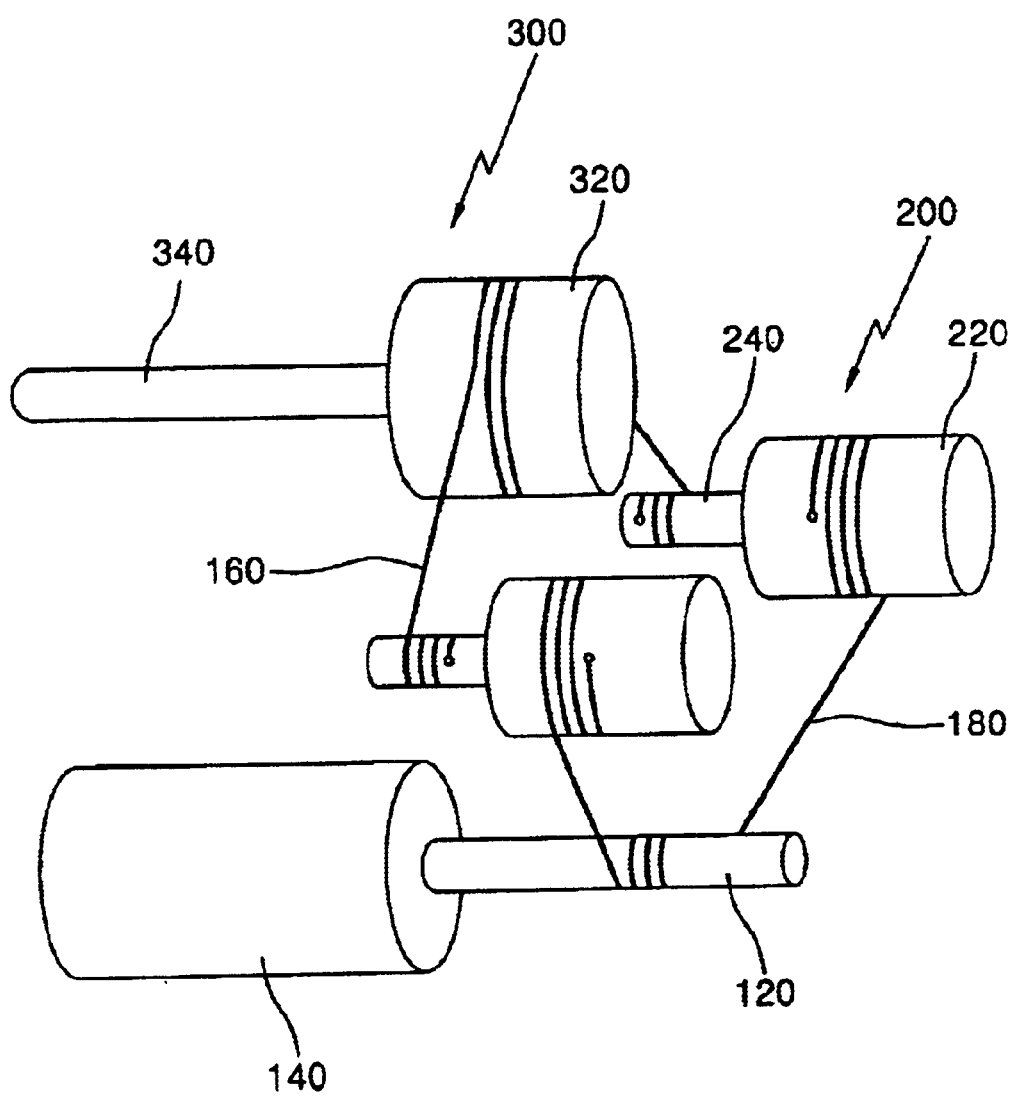
FIG. 1 is a perspective view of a conventional speed reducing device.

Reference now should be made to the drawings, in which the same reference numerals are used throughout the different drawings to designate the same or similar components.

Figure 2:
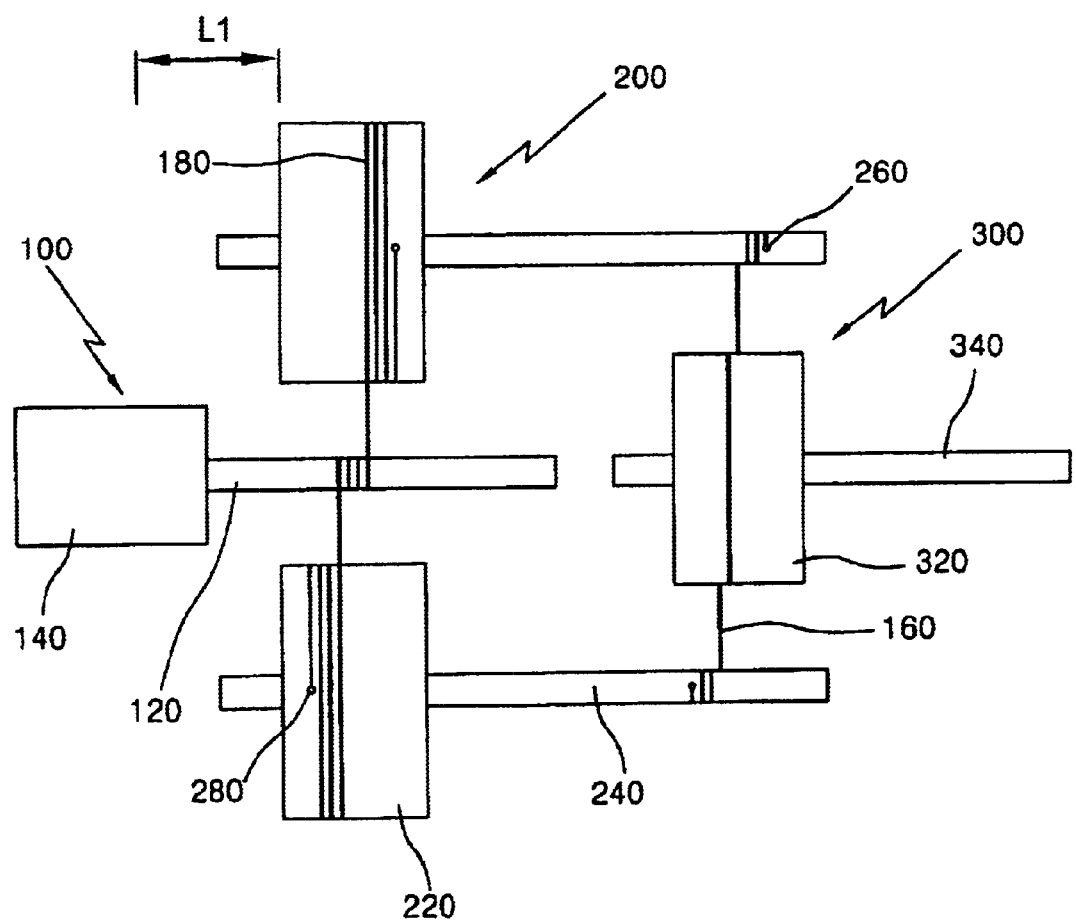
FIG. 2 is a front view of a backlash-free speed reducing device in accordance with the preferred embodiment of the present invention.

FIG. 2 is a front view of a backlash-free speed reducing device in accordance with the preferred embodiment of the present invention. As shown in the drawing, the speed reducing device of this invention comprises a drive unit 100. This drive unit 100 comprises a drive motor 140, with a longitudinal drive shaft 120 axially extending from the drive motor 140. A first power transmission cable 180 is wound around the drive shaft a predetermined number of times.

The speed reducing device of this invention also comprises a rotary unit 200 having two first rotatable cylinders 220. The first transmission cable 180 is fixed to the external surfaces of the two first cylinders 220 of the rotary unit 200 at its opposite ends. Since the first transmission cable 180 is also wound around the drive shaft 120 of the drive motor 140 as described above, the cable 180 can be wound around or unwound from the two first cylinders 220 while rotating the cylinders 220 in response to a rotation of the drive shaft 120. Each of the two rotatable cylinders 220 is concentrically fitted over a rotating shaft 240 such that the cylinders 220 are movable along the rotating shafts 240 a distance L1.

In order to fix the opposite ends of the first cable 180 on the cylinders 220, a first fixing hole 280 is formed on the external surface of each cylinder 220. A second power transmission cable 160 is fixed to the external surfaces of the rotating shafts 240 of the two first cylinders 220 at its opposite ends. This second transmission cable 160 is also wound around the second rotatable cylinder 320 of a power output unit 300 several times at its middle portion. The second transmission cable 160 can be thus wound around or unwound from the rotating shafts 240 of the two first cylinders 220 while rotating the second cylinder 320 of the power output unit 300 in accordance with a rotation of the two first cylinders 220. In order to fix the opposite ends of the second cable 160 on the rotating shafts 240 of the rotary unit 200, a second fixing hole 260 is formed on the external surface of each rotating shaft 240.

As described above, the second transmission cable 160 is fixed to the external surfaces of the two rotating shafts 240 at its opposite ends, and is wound around the cylinder 320 of the power output unit 300 several times at its middle portion. The rotatable cylinder 320 of the power output unit 300 is concentrically fitted over a power output shaft 340 such that the cylinder 320 is movable along the power output shaft 340.

In an operation of the speed reducing device of this invention, the rotating force of the drive motor 140 is transmitted to the cylinder 320 of the power output unit 300 through the drive shaft 120, the first transmission cable 180, the rotary unit 200, and the second transmission cable 160.

When the drive shaft 120 is rotated in a direction by the rotating force of the motor 140, the first tensioned cable 180 is unwound from one of the two first cylinders 220 while rotating the cylinder 220, and is wound around the other first cylinder 220 while rotation the cylinder 220. The rotating force of the two first cylinders 220 is, thereafter, transmitted to the cylinder 320 of the power output unit 300 prior to being transmitted to a target mechanism through the power output shaft 340.

During an operation of the speed reducing device, the first transmission cable 180 is moved in either direction in accordance with a rotating direction of the drive shaft 120. During such a rotation of the drive shaft 120, the first transmission cable 180 maintains its desired tension since the cable 180 is not loosened at portions between the drive motor 120 and the two first cylinders 220.

That is, since the first and second cylinders 220 and 320 of the two units 200 and 300 are linearly movable along their shafts 240 and 340, the first transmission cable 180 is not loosened at portions between the drive motor 120 and the two first cylinders 220, and maintains its desired tension. Therefore, the speed reducing device prevents a backlash of the cable 180 when the device is operated to achieve a high speed reduction ratio.

Figure 3:
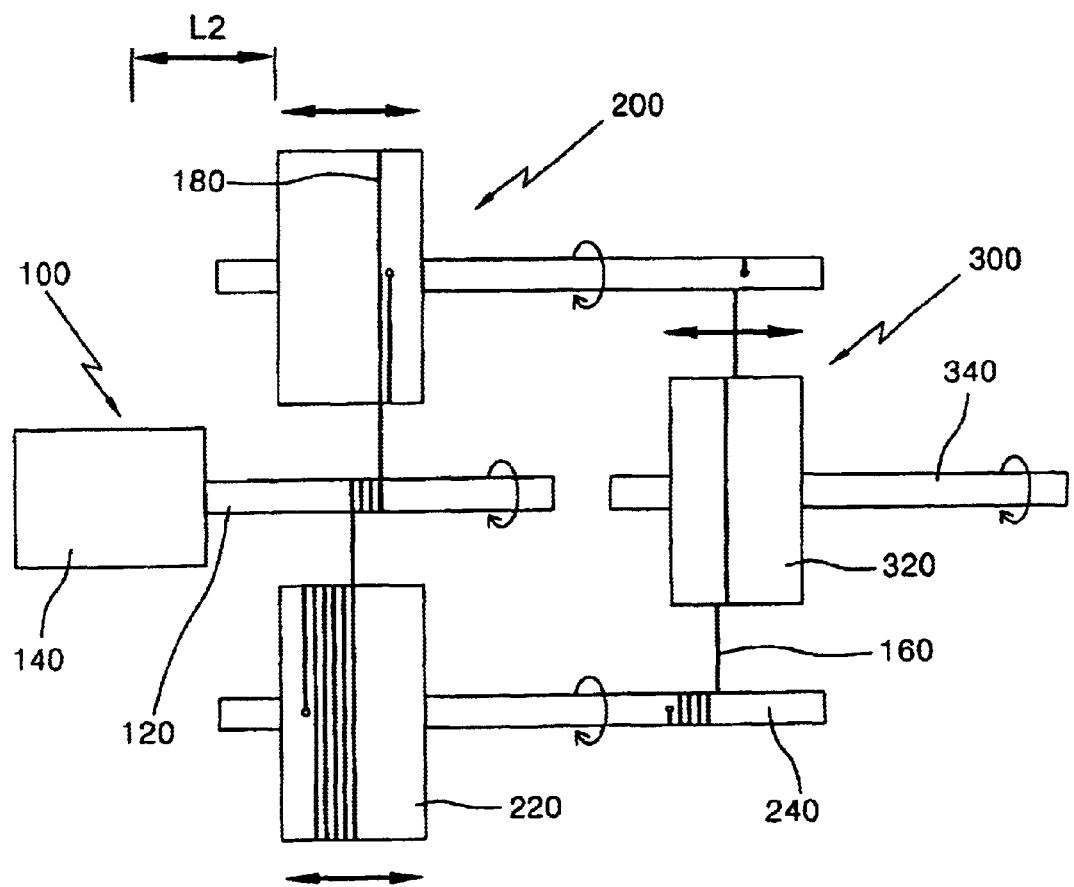
FIG. 3 is a front view of the backlash-free speed reducing device of this invention, showing an operation of the device.

FIG. 3 is a front view of the backlash-free speed reducing device of this invention, showing an operation of the device. As shown in the drawing, when the drive shaft 120 is rotated in a direction by the rotating force of the motor 140, the two cylinders 220 of the rotary unit 200 are rotated by the first transmission cable 180 wound around the drive shaft 120.

That is, in response to a rotation of the drive motor 140, the cable 180 is unwound from one of the two first cylinders 220 to rotate the cylinder 220, and is wound around the other first cylinder 220 to rotate the cylinder 220.

When the cable 180 is wound around one cylinder 220 and is unwound from the other cylinder 220 as described above, the two cylinders 220 linearly move along their rotating shafts 240 a distance L2.

The second power transmission cable 160 is fixed to the external surfaces of the rotating shafts 240 of the two first cylinders 220 at its opposite ends, and is wound around the second rotatable cylinder 320 of the power output unit 300 at its middle portions. This cylinder 320 of the power output unit 300 is linearly movable along the power output shaft 340. The rotating force of the two cylinders 220 of the rotary unit 200 is thus precisely transmitted to the cylinder 320 of the power output unit 300 through the second transmission cable 160 without creating any backlash of the second cable 160.

Therefore, the first and second transmission cables 180 and 160 of the speed reducing device of this invention maintain their desired tension during an operation of the device for achieving a high speed reduction ratio, and so the device almost completely prevents any backlash of the transmission cables during such operation.

As described above, the present invention provides a backlash-free speed reducing device. In the speed reducing device of this invention, all the rotatable cylinders of a rotary unit and a power output unit are linearly movable along their shafts in opposite directions when the cylinders are rotated by the power transmission cables operated in conjunction with the drive shaft of a drive motor.

Since all the rotatable cylinders of the speed reducing device of this invention are linearly movable along their shafts in opposite directions as described above, the first and second transmission cables maintain their desired tension during an operation of the device for achieving a high speed reduction ratio. The speed reducing device of this invention thus almost completely prevents any backlash of the transmission cables during such operation.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A backlash-free speed reducing device, comprising:
   a drive motor for generating rotation power and outputting the rotation power through, a drive shaft axially extending therefrom, the drive motor is fixedly installed at its position;
   a first power transmission cable wound around said drive shaft a predetermined number of times at a predetermined position of the drive shaft;
   a rotary unit having first two rotatable cylinders for receiving the rotation power via the first power transmission cable, with the first power transmission cable fixed to each external surface of said rotatable cylinders at each end thereof and wound around or unwound from said first two rotatable cylinders in response to a rotation of said drive shaft, wherein said first two rotatable cylinders have rotating shafts concentrically fitted to each first two rotatable cylinders, and wherein said first two rotatable cylinders are installed to be linearly movable along said rotating shafts in opposite direction when the first power transmission cable is winding around and unwinding from the first two rotatable cylinders;
   a second power transmission cable fixed to external surface of said rotating shafts of the first two rotatable cylinders at each end thereof and wound around said rotating shafts a predetermined number of times; and
   a power output unit having a second rotatable cylinder for receiving the rotation power from the rotating shafts of the first two rotatable cylinders via the second power transmission cable, with the second transmission cable wound around said second rotatable cylinder, wherein said second rotatable cylinder has a power output shaft concentrically fitted to the second rotatable cylinder for outputting the rotation power to outside, and wherein said second rotatable cylinder and said power output shaft connected thereto are installed to be rotatable at their original position when the second power transmission cable rotates the second rotatable cylinder.

2. The backlash-free speed reducing device according to claim 1, wherein a diameter of said drive shaft is relatively smaller than that of said first two rotatable cylinders, and the diameter of the first two rotatable cylinders is relatively larger than that of the rotating shafts.

3. The backlash-free speed reducing device according to claim 2, wherein the diameter of said rotating shafts is relatively smaller than that of the second rotatable cylinder and the diameter of the second rotatable cylinder is relatively larger than that of the output power shaft.

4. The backlash-free speed reducing device according to claim 1, wherein a diameter of said rotating shafts is relatively smaller than that of said second rotatable cylinder and the diameter of the second rotatable cylinder is relatively larger than that of the output power shaft.

* * * * *